No. 626,628. Patented June 6, 1899.
A. P. MILLER.
CAR SEAL.
(Application filed June 13, 1898.)
(No Model.)
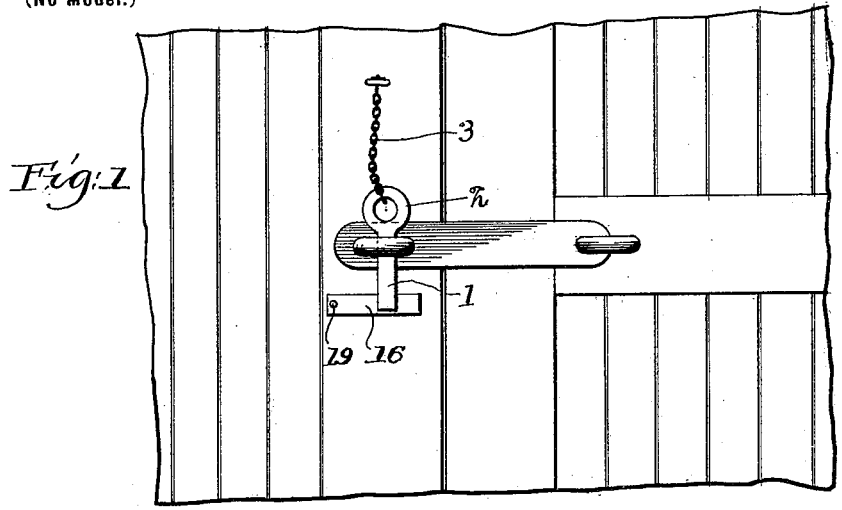
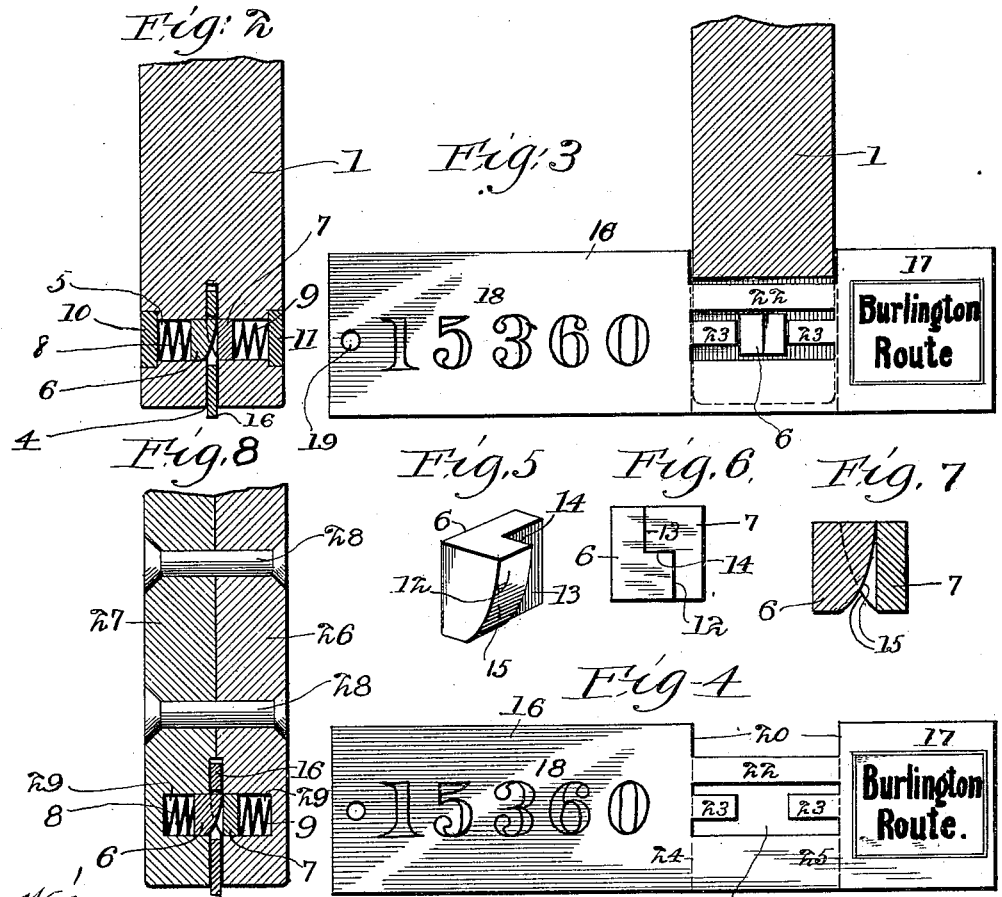
Witnesses
Wm. M. Rheem.
Harold G. Barrett.
Inventor
Alfred P. Miller,
by Coburn, Hibben & McElroy
Attys
THE NORRIS PETERS CO., PHOTO-LITHO., WASHINGTON, D. C.

UNITED STATES PATENT OFFICE.

ALFRED P. MILLER, OF CHICAGO, ILLINOIS, ASSIGNOR TO THE MILLER CAR LOCK AND SEAL COMPANY, OF SAME PLACE.

CAR-SEAL.

SPECIFICATION forming part of Letters Patent No. 626,628, dated June 6, 1899.

Application filed June 13, 1898. Serial No. 683,297. (No model.)

*To all whom it may concern:*

Be it known that I, ALFRED P. MILLER, residing at Chicago, Cook county, Illinois, have invented certain new and useful Improvements in Car-Seals, of which the following is a specification.

My invention has relation to what is known as a "car-seal" for use on railway-cars and the like; and its object is to provide a car-seal which shall be simple and inexpensive in construction, but positive and reliable in operation.

My device is designed to be absolutely proof against improper and fraudulent manipulation, and also unaffected in any manner by exposure to all conditions of weather; and my invention consists of the features and details of construction hereinafter described and claimed.

In the drawings, Figure 1 is an elevation showing a portion of a car with my car-seal attached thereto; Fig. 2, a central sectional view showing a portion of my device on a somewhat enlarged scale; Fig. 3, a central sectional elevation of the locking-pin with the seal attached; Fig. 4, an elevation of the seal proper; Figs. 5, 6, and 7, enlarged detail views of certain of the operating parts of the device; and Fig. 8, a section of a modified form of construction.

My car-seal device comprises a locking member or pin 1, of any suitable shape and dimensions, preferably having a ring-head 2 to receive the chain 3 or other suitable means for fastening it to the car. This locking member is provided at its free end with a longitudinal slit 4, extending part way along the length of the member for a distance preferably somewhat less than the width of the seal proper, in order that the latter may project slightly beyond the pin for a purpose hereinafter described.

The locking member may be made in a single piece, as shown in Fig. 2, or, if desired, it may be made in two pieces secured rigidly together to form practically a solid integral pin, as shown in Fig. 8. When the device is constructed according to the first form, a hole 5 is made transversely through the pin and substantially at right angles to the slit 4. Within this hole 5 and projecting into the slit is a pair of dogs 6 and 7, which are similar and adapted to be pressed sidewise and separated against the tension of their respective springs 8 and 9. These various parts are assembled and held in position in the following manner: Either end of the transverse hole in the pin is first securely closed in any suitable manner, as by a plug 10, and the same is properly secured therein to make it practically an integral part of the pin and prevent improper access from that direction to the operative parts within. The spring 8 is then inserted from the open end of the hole 5, and the dogs 6 and 7 and spring 9 in correct relation to each other, as shown in Fig. 2, are then inserted, after which the open end of the hole is securely closed in any suitable manner, as by a plug 11. The meeting faces of the dogs are preferably not made flat, but are similarly formed with two surfaces 12 and 13, with a shoulder 14, so that the dogs match and fit into each other. The lower adjacent corners and surfaces of the dogs are also preferably rounded or beveled, as shown at 15, in order that the seal may when inserted enter in between them and act like a wedge.

The strip or seal proper, 16, is made of thin sheet metal or other material suitable to subserve the purpose desired and is adapted to fit closely in the slit in the pin. It is preferably formed with a recess on its edge and with an interior slot or opening, as shown more particularly in Fig. 4. This recess and the slot are arranged on the seal so as to form a portion 17, which may be used to receive the name or indication of the railroad or other owner or shipper, and a portion 18 to receive the number of the seal. A hole 19 is preferably provided, so that the seals may be easily strung.

The recess 20 is preferably rectangular, and its longer side is substantially the width or diameter of the locking-pin. The slit in the pin is somewhat less in depth than the width of the seal or strip, so that the sides of the recess extend upward upon the outer face of the pin, thereby preventing undue play of the seal. The slot or opening 21 in the seal or strip is made by stamping out a portion which is preferably substantially H-shaped, whereby a bar 22 and oppositely-projecting pieces 23 are provided. The strip or seal may be scored along both the lines 24 and 25, although scoring on one only of these lines would be sufficient. These lines are located at the ends of the slots and recess, so that when broken along either line the seal is withdrawable sidewise of the pin.

My device being constructed as above set forth operates as follows: The pin is first inserted in proper position to lock the car-door and the seal is then inserted in its slit. When the bar 22 of the seal contacts the dogs and enters in between them, they are forced sidewise to permit the passage of the seal. After the seal has been forced in farther the dogs snap back in place and occupy a position between the free ends of the pieces 23. It is now impossible to withdraw the seal, and therefore to unlock the door without disturbing and breaking the seal. To break the seal, either the portion 17 or the portion 18 of the seal is bent, so as to cause it to break or crack off close to the locking pin or member along the scored line—that is, adjacent to the side of the pin—whereupon the entire seal is freely removable from the pin.

The seal preferably projects a slight distance beyond the end of the pin in order to prevent the insertion of a wedge or other instrument to pry the ends apart. The pieces 23 are particularly useful to prevent the insertion of any device at the side to pick the seal by forcing back the dogs and allowing the seal to be withdrawn without breaking it. I do not limit myself to the form of plugs shown in the drawings for closing the hole 5, as any other suitable means may be adopted so long as the hole is securely closed and an abutment made for the springs.

In the modified form (shown in Fig. 8) the strip or seal is similar to that shown in the other form; but the locking member or pin is made of two parts 26 and 27, held together after the operative parts therein are assembled by rivets 28 or in any other suitable manner. Registering sockets 29 are formed in the adjacent faces of the parts 26 and 27 and receive the springs and dogs. The operation of this form is precisely the same as that of the other form above described.

By the use of my invention I am enabled to provide a simple car-seal which is positive in operation. On account of the construction and arrangement of parts it is absolutely impossible to pick the seal or in any way unlock the car-door without breaking the seal. Furthermore, the strips or seals proper are very light in construction and a large number of them can conveniently be carried by an operator whose duties are to seal car-doors, so that the objections to many of the heavy and cumbersome devices now employed are avoided.

Although I have described more or less precise forms and details of construction, I do not wish to be understood as limiting myself thereto, as I contemplate changes in form, the proportion of parts, and the substitution of equivalents as circumstances may suggest or render expedient and without departing from the spirit of my invention.

I claim—

1. A car-seal comprising a locking member having an open longitudinal slit in its free end, spring-pressed dogs projecting into and transverse of the slit and a flat seal adapted to be inserted longitudinally of the slit and retained therein by the dogs.

2. A car-seal comprising a locking member having a substantially straight-sided open longitudinal slit in its free end, a seal adapted to be inserted longitudinally of the slit and means in the locking member for normally retaining the seal therein, such seal being breakable to permit its removal from the locking member.

3. A car-seal comprising a locking member having an open longitudinal slit in its free end, a seal adapted to be inserted longitudinally of the slit, and catch mechanism movable transverse of the slit for engaging and retaining the seal therein.

4. A car-seal comprising a locking member having an open longitudinal slit in its free end, the walls of said slit being flat and parallel, a seal adapted to be inserted in the slit and having one side scored along a line adjacent to a side of the locking member when the seal is in place whereby the seal is removable when broken, and means for normally retaining the seal in the slit after insertion.

5. A car-seal comprising a locking member having an open longitudinal slit in its free end, a seal adapted to be inserted in the slit and having one side scored along a line adjacent to a side of the locking member when the seal is in place whereby the seal is breakable and removable, and spring-pressed dogs arranged within the locking member and projecting into and transverse of the slit to normally retain the seal after insertion.

6. A car-seal comprising a locking member having an open longitudinal slit in its free end, the walls of said slit being flat and parallel, a flat seal adapted to fit closely within the slit and provided with a hole or slot, and catch mechanism arranged within the locking member and projecting into and transverse of the slit to permit the entrance but prevent the withdrawal of the seal, such catch mechanism engaging in the hole in the seal.

7. A car-seal comprising a locking member having an open longitudinal slit, a flat seal adapted to be inserted longitudinally therein and provided with a hole or slot, and spring-pressed dogs arranged within such locking member and adapted to engage in the hole in the seal after insertion, such seal being transversely scored along a line adjacent to a side of the locking member.

8. A car-seal comprising a locking member having an open longitudinal slit, a flat seal insertible longitudinally therein and provided with a slot which is substantially the width of the locking member, and spring-pressed dogs arranged within such locking member and engaging in the slot in the seal after insertion, such seal being adapted to be broken transversely along a line adjacent to a side of the locking member whereby the seal is withdrawable laterally to the locking member.

9. A car-seal comprising a locking member having an open longitudinal slit at its end, a flat seal insertible in the slit longitudinally of said member and provided with a slot, and catch mechanism arranged within the locking member and engaging in the slot in the seal after insertion, the seal being transversely scored along a side of the locking member and the slot extending to one side of such locking member to the line of scoring whereby the seal may be broken off along such line and then be withdrawable.

10. A car-seal comprising a locking member, a seal insertible therein and having a closed interior opening formed by stamping out therefrom a portion substantially H-shaped to form two connected slots and catch mechanism within the locking member permitting the insertion of the seal but engaging in the interior opening to prevent withdrawal.

11. A car seal comprising a locking member, a seal insertible therein and having a closed interior opening formed by stamping out a portion substantially H-shaped to form two connected slots, said seal being scored transversely at the foot of the legs of the H of the opening and catch mechanism in the locking member engaging the opening when the seal is inserted.

12. A car-seal comprising a locking member or pin having a longitudinal slit at its end, a pair of dogs arranged within the pin upon opposite sides of the slit and extending across the slit normally in contact with each other, springs normally pressing the dogs into such contact, and a seal having an interior opening engaged by the dogs after insertion and also having a marginal recess of the same width as the pin whereby the seal fits securely upon the pin after being engaged by the dogs.

13. A car-seal comprising a locking member or pin having a longitudinal slit at its end, a pair of spring-pressed dogs arranged within the pin upon opposite sides of the slit and extending across the slit normally in contact with each other, each dog having surfaces 12 and 13 and shoulder 14 whereby they are adapted to match and fit into each other and a seal insertible in the slit and adapted to be engaged by the dogs.

14. A car-seal comprising a locking member or pin having a longitudinal slit at its end, a pair of spring-pressed dogs arranged within the pin upon opposite sides of the slit, each dog having surfaces 12 and 13 and a shoulder 14 and also having a beveled portion 15 and a seal insertible in the slit and adapted to be engaged by the dogs.

15. A car-seal comprising a locking member or pin having a straight longitudinal slit at its end, a thin flat strip insertible in said slit and catch mechanism for engaging the strip after insertion, said strip having a substantially H-shaped interior opening or slot forming a bar 22 and pieces 23.

16. A car-seal comprising a pin having a longitudinal slit at one end, means for fastening the other end to the car, sockets arranged in the pin, one on each side of the slit, similarly-shaped dogs arranged in the sockets and adapted to fit into and match each other, springs abutting the dogs respectively for normally holding them in contact across the slit, a flat thin seal substantially of the same thickness as the slit and adapted to be inserted therein, such seal having a slot in which the dogs engage, the slit in the pin being of less depth than the width of the seal whereby the latter projects from the end of the pin.

17. A car-seal comprising a pin having a straight longitudinal slit at one end, means for securing the other end to the car, a flat seal insertible in the slit from the end of the pin and longitudinally thereof, and catch mechanism in the pin for retaining the seal therein after insertion, such slit in the pin being of less depth than the width of the seal whereby the latter projects from the end of the pin.

18. A car-seal comprising a locking member 1, having a longitudinal slit 4, interior sockets located in the locking member and disposed opposite each other on either side of the slit, dogs 6 and 7 arranged in the sockets respectively, springs 8 and 9 for the dogs respectively, each dog having the two surfaces 12 and 13 and a shoulder 14 and also having its lower or outer face beveled, a strip or seal 16 having a substantially H-shaped interior opening 21 and transversely scored so as to break through the opening 21 and a recess 20 upon the margin of the strip and adjacent to the interior opening.

19. A car-seal comprising a locking member, and a seal insertible therein and having a transverse line of scoring adjacent to the side of the locking member, said seal having an interior opening with slots extending therefrom to the line of scoring.

ALFRED P. MILLER.

Witnesses:
  SAMUEL E. HIBBEN,
  LOUISE SERAGE.